(12) United States Patent
DeLuca et al.

(10) Patent No.: US 11,184,251 B2
(45) Date of Patent: Nov. 23, 2021

(54) DATA CENTER CARTOGRAPHY BOOTSTRAPPING FROM PROCESS TABLE DATA

(71) Applicant: International Business Machines Corporation, Armonk, NY (US)

(72) Inventors: Chad E. DeLuca, Morgan Hill, CA (US); Alfredo Alba, Morgan Hill, CA (US); Chris Kau, Mountain View, CA (US); Daniel Gruhl, San Jose, CA (US); Linda H. Kato, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/182,962

(22) Filed: Feb. 23, 2021

(65) Prior Publication Data

US 2021/0176138 A1 Jun. 10, 2021

Related U.S. Application Data

(63) Continuation of application No. 16/446,531, filed on Jun. 19, 2019, now Pat. No. 11,018,953.

(51) Int. Cl.
*G06F 15/16* (2006.01)
*H04L 12/24* (2006.01)
*G06F 40/40* (2020.01)

(52) U.S. Cl.
CPC .............. *H04L 41/22* (2013.01); *G06F 40/40* (2020.01); *H04L 41/082* (2013.01); *H04L 41/0893* (2013.01); *H04L 41/12* (2013.01)

(58) Field of Classification Search
CPC ... H04L 41/22; H04L 41/082; H04L 41/0893; H04L 41/12; G06F 40/40
(Continued)

(56) References Cited

U.S. PATENT DOCUMENTS

| 5,233,513 A | 8/1993 | Doyle |
| 7,096,210 B1 | 8/2006 | Kramer et al. |

(Continued)

OTHER PUBLICATIONS

Mell, P., et al., "The NIST Definition of Cloud Computing", National Institute of Standards and Technology Special Publication 800-145, Sep. 2011, pp. 1-7, U.S. Department of Commerce, United States.

(Continued)

*Primary Examiner* — Melvin H Pollack
(74) *Attorney, Agent, or Firm* — Sherman IP LLP; Kenneth L. Sherman; Steven Laut

(57) ABSTRACT

One embodiment provides a method including identifying all computing nodes and connections associated with the computing nodes in a data center based on running processes in the data center that communicate with one another. For each computing node, running processes are identified using natural language processing (NLP) by: iteratively refining a rule set that enables processing of surveillance information from the data center into an initial map of systems and applications in the data center, and extracting known process entities according to predetermined rules from the rule set. A visual dependency representation of the computing nodes and the processes running on the computing nodes is generated.

20 Claims, 10 Drawing Sheets

(58) Field of Classification Search
USPC .......................................................... 709/221
See application file for complete search history.

(56) References Cited

U.S. PATENT DOCUMENTS

| | | | |
|---|---|---|---|
| 7,720,674 | B2 | 5/2010 | Kaiser et al. |
| 8,489,721 | B1 | 7/2013 | Gokhale et al. |
| 8,892,419 | B2 | 11/2014 | Lundberg et al. |
| 9,164,977 | B2 | 10/2015 | Byron et al. |
| 9,183,074 | B2 | 11/2015 | Michel et al. |
| 9,207,963 | B2 | 12/2015 | Kruglick |
| 9,237,165 | B2 | 1/2016 | Fine et al. |
| 9,246,777 | B2 | 1/2016 | Murase et al. |
| 9,298,846 | B2 | 3/2016 | Vernon et al. |
| 9,317,541 | B2 | 4/2016 | Shimanovsky et al. |
| 9,330,119 | B2 | 5/2016 | Chan et al. |
| 9,430,858 | B1 | 8/2016 | Har et al. |
| 9,461,876 | B2 | 10/2016 | Van Dusen et al. |
| 9,471,885 | B1 | 10/2016 | Rubin |
| 9,898,317 | B2 | 2/2018 | Nakil et al. |
| 10,075,347 | B2 | 9/2018 | Jain |
| 10,101,162 | B2 | 10/2018 | Arya et al. |
| 10,142,353 | B2 | 11/2018 | Yadav et al. |
| 10,177,998 | B2 | 1/2019 | Parandehgheibi et al. |
| 10,200,376 | B2 | 2/2019 | Cayton et al. |
| 10,230,597 | B2 * | 3/2019 | Parandehgheibi .... G06F 16/173 |
| 10,230,601 | B1 * | 3/2019 | Qin .......................... H04L 43/08 |
| 10,333,820 | B1 * | 6/2019 | Wang ...................... H04L 41/12 |
| 10,346,762 | B2 | 7/2019 | Greenspan et al. |
| 10,366,096 | B2 | 7/2019 | Ferrar |
| 10,394,682 | B2 * | 8/2019 | Song .................. G06F 11/3409 |
| 10,437,935 | B2 | 10/2019 | Sittel et al. |
| 10,445,215 | B2 | 10/2019 | Bull et al. |
| 10,460,042 | B2 | 10/2019 | Byron et al. |
| 10,528,600 | B1 * | 1/2020 | Ni .......................... G06F 16/285 |
| 10,528,656 | B2 * | 1/2020 | Lai .......................... G06Q 30/08 |
| 10,559,202 | B2 * | 2/2020 | Yang .................... G11B 27/031 |
| 10,594,718 | B1 * | 3/2020 | Deaguero ............. G06F 21/552 |
| 10,600,012 | B2 * | 3/2020 | Peterson ............ G06Q 10/0635 |
| 10,616,038 | B2 | 4/2020 | Kushmerick et al. |
| 10,637,744 | B2 | 4/2020 | Carroll et al. |
| 10,637,745 | B2 * | 4/2020 | Naous ................... H04L 41/064 |
| 10,642,712 | B2 | 5/2020 | Luo et al. |
| 10,649,838 | B2 | 5/2020 | Johnston et al. |
| 10,698,923 | B2 | 6/2020 | Martin et al. |
| 10,742,544 | B2 | 8/2020 | Roeland et al. |
| 10,762,049 | B1 | 9/2020 | Kulshreshtha et al. |
| 10,769,152 | B2 | 9/2020 | Huang et al. |
| 10,776,577 | B2 | 9/2020 | Sharma et al. |
| 10,795,949 | B2 * | 10/2020 | Hatami-Hanza ...... G06F 16/951 |
| 10,855,547 | B2 * | 12/2020 | Abu Asba .............. G06F 9/451 |
| 10,884,636 | B1 * | 1/2021 | Abrol ...................... G06F 3/067 |
| 10,911,320 | B2 * | 2/2021 | Asba ................... H04L 41/5009 |
| 10,924,370 | B2 * | 2/2021 | Yenumulapalli ........ H04L 51/18 |
| 10,937,465 | B2 * | 3/2021 | Jaenisch ............. G06F 11/1008 |
| 10,969,929 | B2 * | 4/2021 | Vadapandeshwara ...................... G06F 3/04817 |
| 10,970,298 | B1 * | 4/2021 | Madheswaran ....... G06F 16/285 |
| 11,080,336 | B2 * | 8/2021 | Van Dusen ......... G06Q 30/0279 |
| 2009/0199160 | A1 | 8/2009 | Vaitheeswaran et al. |
| 2014/0236663 | A1 | 8/2014 | Smith et al. |
| 2016/0105329 | A1 | 4/2016 | Coates et al. |
| 2016/0189034 | A1 | 6/2016 | Shakeri et al. |
| 2016/0255139 | A1 | 9/2016 | Rathod |
| 2016/0266728 | A1 | 9/2016 | Sakhavaram et al. |
| 2016/0358021 | A1 | 12/2016 | Hong et al. |
| 2016/0359695 | A1 | 12/2016 | Yadav et al. |
| 2017/0177710 | A1 | 6/2017 | Burlik |
| 2017/0302565 | A1 | 10/2017 | Ghobadi et al. |
| 2017/0302572 | A1 | 10/2017 | Izhak-Ratzin et al. |
| 2018/0114158 | A1 | 4/2018 | Foubert et al. |
| 2018/0137424 | A1 | 5/2018 | Gabaldon Royval et al. |
| 2018/0270110 | A1 | 9/2018 | Chugtu et al. |
| 2019/0266291 | A1 | 8/2019 | Kummamuru et al. |
| 2020/0004598 | A1 | 1/2020 | Brebner |
| 2020/0007396 | A1 * | 1/2020 | Fainberg ............... H04L 41/145 |
| 2020/0019643 | A1 | 1/2020 | Roy et al. |
| 2020/0050586 | A1 | 2/2020 | Pal et al. |
| 2020/0065303 | A1 | 2/2020 | Bhattacharjee et al. |
| 2020/0265063 | A1 | 8/2020 | McLean |
| 2020/0028890 | A1 | 11/2020 | White et al. |
| 2020/0366573 | A1 * | 11/2020 | White ..................... H04L 43/50 |

OTHER PUBLICATIONS

Jou, B. et al.; "SentiCart: Cartography And geo-Contextualization For Multilingual Visual Sentiment", ICMR'16 ACM International Conference On, pp. 389-392, Jun. 6-9, 2016, ACM, United States.

Hruby, F., et al.; "Cloud-Based Atlassing", Journal for Geographic Information Science, pp. 305-314, Jan. 2015, Journal for Geographic Information Science, Conabio, Mexico City, Dresden University Of Technology, Germany.

Kanimozhi, E., et al.; "Trusted Cloud—A Solution For Cloud Cartography", Journal Of Global Research In Computer Science, vol. 3, No. 11, pp. 44-51, Nov. 2012, 3 (11), United States.

Wang.Y., et al.; "CrowdAtlas: Self-Updating Maps For Cloud And Personal Use", MobiSys'13 11th ACM Annual International Conference On, pp. 27-40, Jun. 25-28, 2013, ACM, United States.

Deng, Y. et al., "An Ontology-Based Framework for Model-Driven Analysis of Situations in Data Centers," 2013 IEEE 10th International Conference on Services Computing, Jun. 28, 2013, pp. 289-295, United States.

Awad, M., et al., "Automatic Workload Characterization Using System Log Analysis," In Proceedings 2015 Computer Measurement Group Conf., Nov. 3-5, 2015, pp. 1-11, San Antonio, TX.

Mavlyutov, R. et al., "Dependency-Driven Analytics: a Compass for Uncharted Data Oceans," 8th Biennial Conference on Innovative Data Systems Research (CIDR '17), Jan. 8-11, 2017, pp. 1-9, Chaminade, California, USA.

He, P. et al., "An Evaluation Study on Log Parsing and Its Use in Log Mining," 46th Annual IEEE/IFIP International Conference on Dependable Systems and Networks, Jun. 28, 2016, pp. 654-661, IEEE, United States.

Lemoudden, M., et al., "Managing Cloud-generated Logs Using Big Data Technologies," Oct. 20, 2015, pp. 1-7, IEEE, United States.

Benson, T. et al., "Understanding Data Center Traffic Characteristics," ACM SIGCOMM Computer Communication Review, Aug. 21, 2009, pp. 65-72, ACM, United States.

List of IBM Patents or Patent Applications Treated as Related; DeLuca, C. et al., U.S. Appl. No. 16/446,531, filed Jun. 19, 2019.

* cited by examiner

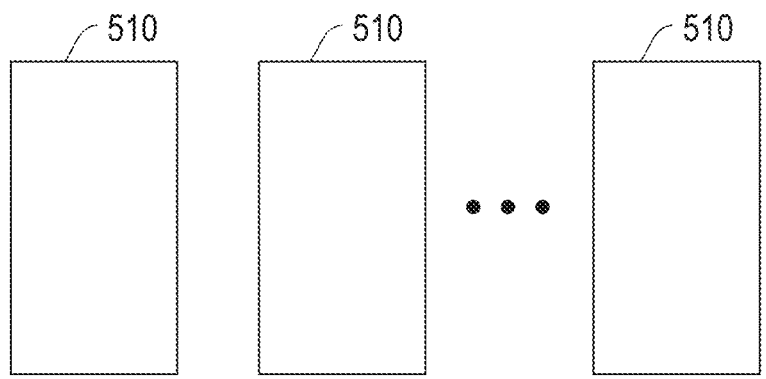
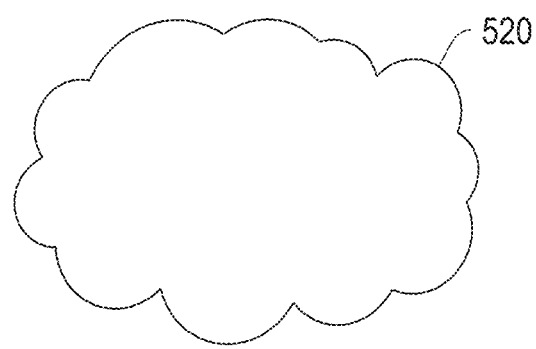
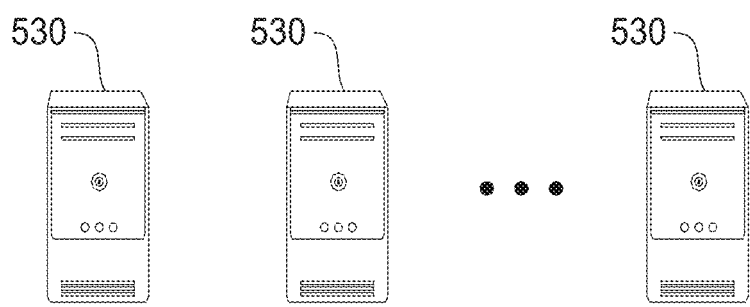
FIG. 5

| Proto | Recv-Q | Send-Q | Local Address | Foreign Address | State | PID/Program Name |
|---|---|---|---|---|---|---|
| tcp | 0 | 0 | 127.0.0.1:24007 | 127.0.0.1:48916 | ESTABLISHED | 8762/glusterd |
| tcp | 0 | 0 | 9.1.34.227:47953 | 9.1.34.227:49153 | ESTABLISHED | 2463/glusterfs |
| tcp | 0 | 0 | 9.1.34.227:46713 | 9.1.34.103:49163 | ESTABLISHED | 2463/glusterfs |
| tcp | 0 | 0 | 9.1.34.227:47845 | 9.1.34.103:49157 | ESTABLISHED | 1586/glusterfs |
| tcp | 0 | 0 | 9.1.34.227:22 | 9.1.71.167:57624 | ESTABLISHED | 2299/sshd: root@not |
| tcp6 | 0 | 0 | 0.0.0.0:34302 | :::* | LISTEN | 26868/ganesha.nfsd |
| tcp6 | 0 | 0 | 0.0.0.0:2049 | :::* | LISTEN | 26868/ganesha.nfsd |
| tcp6 | 0 | 0 | 0.0.0.0:41063 | :::* | LISTEN | 26868/ganesha.nfsd |
| tcp6 | 0 | 0 | 0.0.0.0:875 | :::* | LISTEN | 26868/ganesha.nfsd |
| tcp6 | 0 | 0 | :::111 | :::* | LISTEN | 1352/rpcbind |
| tcp6 | 0 | 0 | :::35344 | :::* | LISTEN | 23969/rpc.statd |
| tcp6 | 0 | 0 | :::564 | :::* | LISTEN | 26868/ganesha.nfsd |
| tcp6 | 0 | 0 | :::22 | :::* | LISTEN | 1764/sshd |

DATA CENTER CARTOGRAPHY BOOTSTRAPPING FROM PROCESS TABLE DATA

BACKGROUND

In the era of software defined environments, data centers evolve and reshape more rapidly than ever before to address ever evolving consumer's needs. Some of the required upgrades include the addition of novel capabilities, i.e., redundancy or performance increase, and therefore requiring migration to more capable and efficient installations. Because of data centers rapid evolution, it is important to understand the topology of a data center at multiple levels, from the physical, power, cooling, cabling, etc., level, to the logical, virtualization, software, applications, tenants, etc.

SUMMARY

Embodiments relate to data center cartography generation. One embodiment provides a method including identifying all computing nodes and connections associated with the computing nodes in a data center based on running processes in the data center that communicate with one another. For each computing node, running processes are identified using natural language processing (NLP) by: iteratively refining a rule set that enables processing of surveillance information from the data center into an initial map of systems and applications in the data center, and extracting known process entities according to predetermined rules from the rule set. A visual dependency representation of the computing nodes and the processes running on the computing nodes is generated.

These and other features, aspects and advantages of the present invention will become understood with reference to the following description, appended claims and accompanying figures.

BRIEF DESCRIPTION OF THE DRAWINGS

FIG. 5 is a block diagram illustrating a distributed system for data center cartography generation processing, according to one embodiment;

FIG. 6 illustrates an example process table used by one or more embodiments;

DETAILED DESCRIPTION

Figure 1:
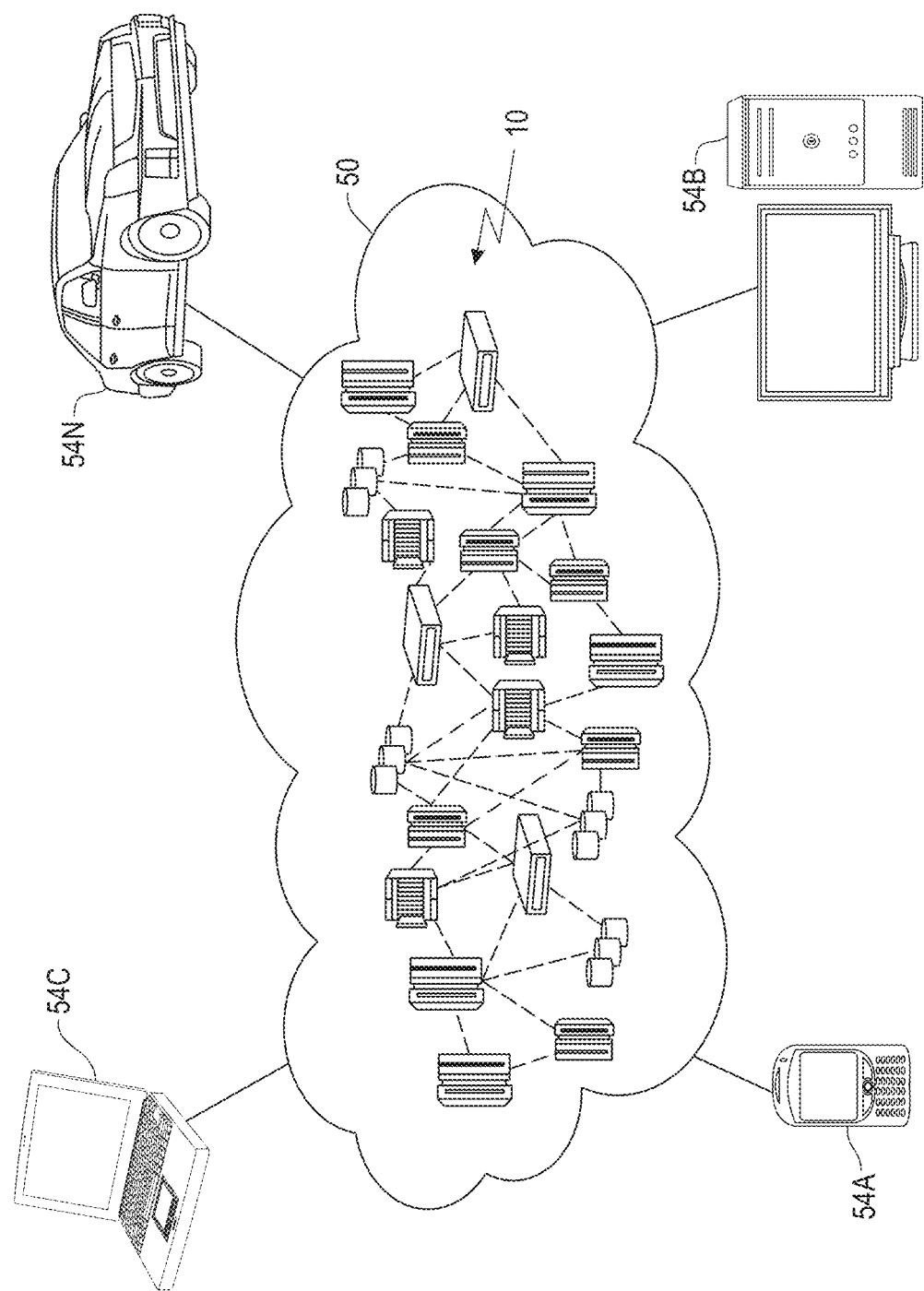
FIG. 1 depicts a cloud computing environment, according to an embodiment.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Embodiments relate to data center cartography generation. One embodiment provides a method that includes identifying all computing nodes and connections associated with the computing nodes in a data center. For each computing node, running processes are identified using natural language processing (NLP) by: extracting known process entities according to predetermined rules; extracting unknown process entities by: grouping process logs that share process entities and identifying hints in parameters and directory paths; receiving annotations to the hints to identify an application a process is running; and creating a new rule based on the annotations and propagating the new rule to other process logs. A visual representation of the computing nodes and the processes running on the computing nodes is generated.

Cloud computing is a model of service delivery for enabling convenient, on-demand network access to a shared pool of configurable computing resources (e.g., networks, network bandwidth, servers, processing, memory, storage, applications, virtual machines (VMs), and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed and automatically, without requiring human interaction with the service's provider.

Broad network access: capabilities are available over a network and accessed through standard mechanisms that promote use by heterogeneous, thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or data center).

Rapid elasticity: capabilities can be rapidly and elastically provisioned and, in some cases, automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported, thereby providing transparency for both the provider and consumer of the utilized service.

Service Models are as follows:

Software as a Service (SaaS): the capability provided to the consumer is the ability to use the provider's applications running on a cloud infrastructure. The applications are accessible from various client devices through a thin client interface, such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is the ability to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is the ability to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load balancing between clouds).

A cloud computing environment is a service oriented with a focus on statelessness, low coupling, modularity, and semantic interoperability. At the heart of cloud computing is an infrastructure comprising a network of interconnected nodes.

Referring now to FIG. 1, an illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows the cloud computing environment 50 to offer infrastructure, platforms, and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
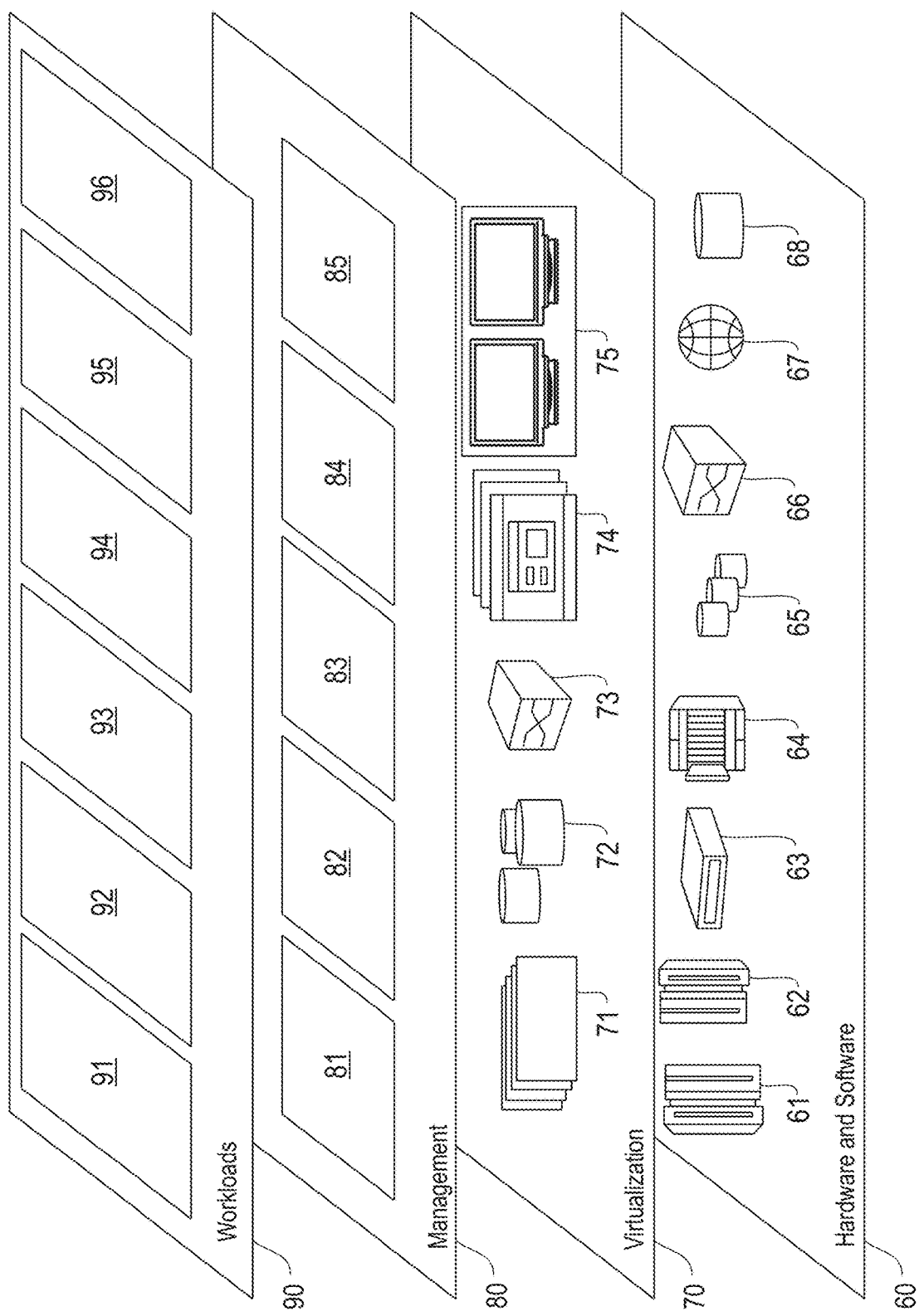
FIG. 2 depicts a set of abstraction model layers, according to an embodiment.

Referring now to FIG. 2, a set of functional abstraction layers provided by the cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, a management layer 80 may provide the functions described below. Resource provisioning 81 provides dynamic procurement of computing resources and other resources that are utilized to perform tasks within the cloud computing environment. Metering and pricing 82 provide cost tracking as resources are utilized within the cloud computing environment and billing or invoicing for consumption of these resources. In one example, these resources may comprise application software licenses. Security provides identity verification for cloud consumers and tasks as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and data center cartography processing 96. As mentioned above, all of the foregoing examples described with respect to FIG. 2 are illustrative only, and the invention is not limited to these examples.

It is understood all functions of one or more embodiments as described herein may be typically performed by the processing system 300 (FIG. 3), hardware system 400 (FIG. 4) or the cloud computing environment 50 (FIG. 1), which can be tangibly embodied as hardware processors and with modules of program code. However, this need not be the case for non-real-time processing. Rather, for non-real-time processing the functionality recited herein could be carried out/implemented and/or enabled by any of the layers 60, 70, 80 and 90 shown in FIG. 2.

It is reiterated that although this disclosure includes a detailed description on cloud computing, implementation of the teachings recited herein are not limited to a cloud computing environment. Rather, the embodiments of the present invention may be implemented with any type of clustered computing environment now known or later developed.

Figure 3:
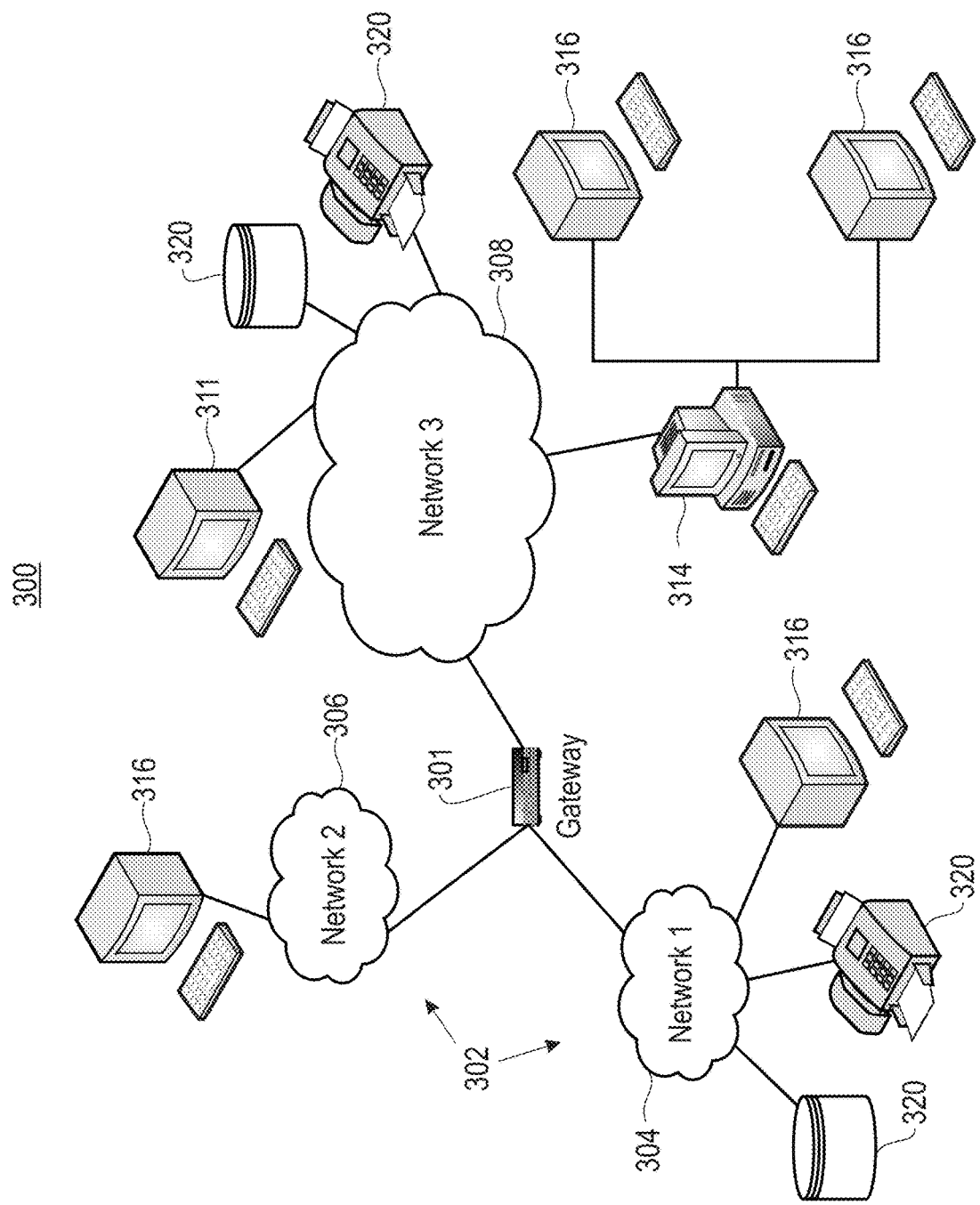
FIG. 3 is a network architecture of a system for data center cartography generation processing, according to an embodiment.

FIG. 3 is a network architecture of a system 300 for data center cartography, according to an embodiment. As shown in FIG. 3, a plurality of remote networks 302 are provided, including a first remote network 304 and a second remote network 306. A gateway 301 may be coupled between the remote networks 302 and a proximate network 308. In the context of the present network architecture 300, the networks 304, 306 may each take any form including, but not limited to, a LAN, a WAN, such as the Internet, public switched telephone network (PSTN), internal telephone network, etc.

In use, the gateway 301 serves as an entrance point from the remote networks 302 to the proximate network 308. As such, the gateway 301 may function as a router, which is capable of directing a given packet of data that arrives at the gateway 301, and a switch, which furnishes the actual path in and out of the gateway 301 for a given packet.

Further included is at least one data server 314 coupled to the proximate network 308, which is accessible from the remote networks 302 via the gateway 301. It should be noted that the data server(s) 314 may include any type of computing device/groupware. Coupled to each data server 314 is a plurality of user devices 316. Such user devices 316 may include a desktop computer, laptop computer, handheld computer, printer, and/or any other type of logic-containing device. It should be noted that a user device 316 may also be directly coupled to any of the networks in some embodiments.

A peripheral 320 or series of peripherals 320, e.g., facsimile machines, printers, scanners, hard disk drives, networked and/or local storage units or systems, etc., may be coupled to one or more of the networks 304, 306, 308. It should be noted that databases and/or additional components may be utilized with, or integrated into, any type of network element coupled to the networks 304, 306, 308. In the context of the present description, a network element may refer to any component of a network.

According to some approaches, methods and systems described herein may be implemented with and/or on virtual systems and/or systems, which emulate one or more other systems, such as a UNIX system that emulates an IBM z/OS environment, a UNIX system that virtually hosts a MICROSOFT WINDOWS environment, a MICROSOFT WINDOWS system that emulates an IBM z/OS environment, etc. This virtualization and/or emulation may be implemented through the use of VMWARE software in some embodiments.

Figure 4:
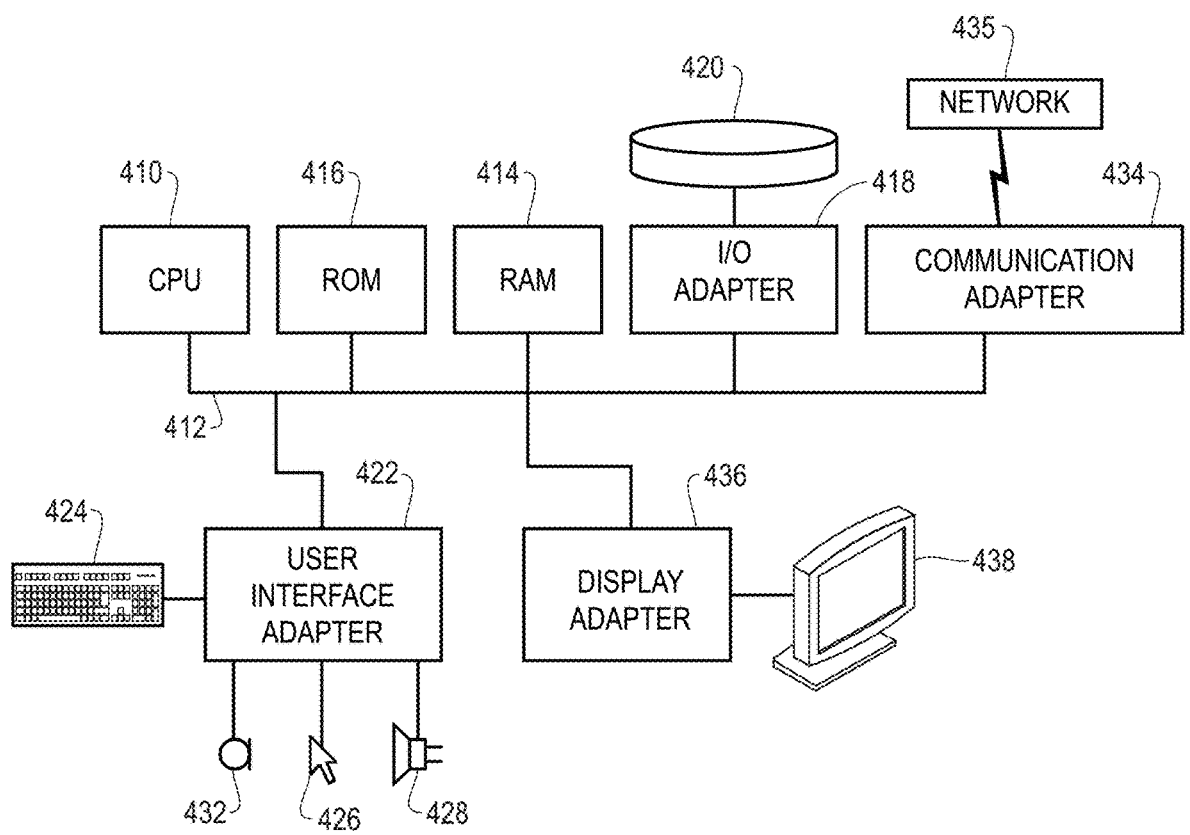
FIG. 4 shows a representative hardware environment that may be associated with the servers and/or clients of FIG. 1, according to an embodiment.

FIG. 4 shows a representative hardware system 400 environment associated with a user device 316 and/or server 314 of FIG. 3, in accordance with one embodiment. In one example, a hardware configuration includes a workstation having a central processing unit 410, such as a microprocessor, and a number of other units interconnected via a system bus 412. The workstation shown in FIG. 4 may include a Random Access Memory (RAM) 414, Read Only Memory (ROM) 416, an I/O adapter 418 for connecting peripheral devices, such as disk storage units 420 to the bus 412, a user interface adapter 422 for connecting a keyboard 424, a mouse 426, a speaker 428, a microphone 432, and/or other user interface devices, such as a touch screen, a digital camera (not shown), etc., to the bus 412, communication adapter 434 for connecting the workstation to a communication network 435 (e.g., a data processing network) and a display adapter 436 for connecting the bus 412 to a display device 438.

In one example, the workstation may have resident thereon an operating system, such as the MICROSOFT WINDOWS Operating System (OS), a MAC OS, a UNIX OS, etc. In one embodiment, the system 400 employs a POSIX® based file system. It will be appreciated that other examples may also be implemented on platforms and operating systems other than those mentioned. Such other examples may include operating systems written using JAVA, XML, C, and/or C++ language, or other programming languages, along with an object oriented programming methodology. Object oriented programming (OOP), which has become increasingly used to develop complex applications, may also be used.

FIG. 5 is a block diagram illustrating a distributed system 500 that may be employed for data center cartography generation processing, according to one embodiment. In one embodiment, the system 500 includes client devices 510 (e.g., mobile devices, smart devices, computing systems, etc.), a cloud or resource sharing environment 520 (e.g., a public cloud computing environment, a private cloud computing environment, a data center, etc.), and servers 530. In one embodiment, the client devices are provided with cloud services from the servers 530 through the cloud or resource sharing environment 520.

In one embodiment, the process of understanding a data center in its multiple facets and dimensions is defined as "data center cartography" and system 500 provides bootstrapping and iterative refinement of a rule set to enable the processing of surveillance information from the data center into an accurate initial map of the systems and applications therein. Understanding what is going on in a data center is an extremely complex task, but one that is critical to continued operation and/or migration of the applications they contain.

FIG. 6 illustrates an example process table 600 used by one or more embodiments. For one embodiment, system 500 (FIG. 5) processing considers the process table (see, e.g., example process table 600) generated through the running of a "PS" (process status) or "task-list" command on each host or node in a data center. This output is referred to as the "process table." One embodiment supports the rapid bootstrapping of a preliminary map based on the process table data as gathered from many (but potentially not all) of the machines (including virtual machines (VMs) in a data center. Each process table has a number of columns, including a "command" column that holds the full command line of the process in question (or other symbols for non-command-line initiated processes). In one example, process table 600 includes the following columns: protocol (e.g., tcp (transmission control protocol), Internet protocol (IP), etc.), receiving queue (recev-Q), sending queue (send-Q), local address, foreign address, state, PID (process identification number) and program name. Other columns may be included as well as required, designed, etc.

Returning to FIG. 5, in one embodiment processing for system 500 includes a task that assigns or adds a "tag" to each line or row in the process table. These tags are mapped into an ontology of processes to better understand the role and relationships between the machines in the data center that realize the application (e.g., a business application). In one embodiment, the rules are embodied in "rule files." The rules are named with a number and name (e.g., 00-client, 30-Oracle °, 80-WindowsSystem, etc.). In one embodiment, these rules are concatenated into a master rule file (in lexical order). In one example embodiment, system 500 processing is halted at each incoming line or row (of the process table) as soon as a "match" is found. In one embodiment, rules include three parts: (1) a tag set that shall be assigned if the rule matches; (2) a rule type (e.g., exact match, substring match, regular expression, path match, etc.); and (3) the rule text.

In one embodiment, an example rule is DB2_ Generic|path_match| \db2\, which would assign the tag "DB2_generic" to any process whose command included db2 as a path segment. Such a generic rule typically appears in a file with a high number (e.g., 99-DB2) to "catch" otherwise unassigned processes. In one embodiment, the rule types include, at least, the following. Exact match—this is useful especially in the case of system programs that appear in just one place or with just one "command line" string. Substring match—this is a more common usage where a program name, or part of a path and then a program are mentioned. Path match—this is useful to flag all files under a particular install location. Argument match—sometimes the arguments themselves provide information to identify a process. With additional data-location TCP/IP information associated with a process can be a strong indicator. Client/Server pairings—if a known client is communicating to an unknown process on a particular port that is a good indication what the server process may be. User ID—all processes owned by a system id (e.g., db2 are very likely DB2 processes). Process parameters for explicit parameters. Learned patterns from product documentation—product documentation may list names of executables or arguments and makes a good place for automatic rule discovery. Process child trees or sub trees—if the child of a process is known, the parent may be inferred and vice versa. Worker thread count—processes with large numbers of worker threads can be constrained to just a few possible types.

In one embodiment, a matching engine in system 500 can run in a mode where it outputs all unmatched results. A number of heuristic rule analytics are available for a subject matter expert to "create" rules. For example "second path" takes the second path element (often the package name) and creates an exact match rule for that element. These rules can then be edited as needed.

In one embodiment, one advantage of the data center cartography generation processing in system 500 is that it enables subject matter experts to quickly explore, characterize and augment complex data. In the case of information about data centers, the subject matter experts are assisted to quickly combine (i) information in the nodes' logs together with (ii) iteratively added knowledge that is not available from the logs to create a cartography of the data center.

Figure 7:
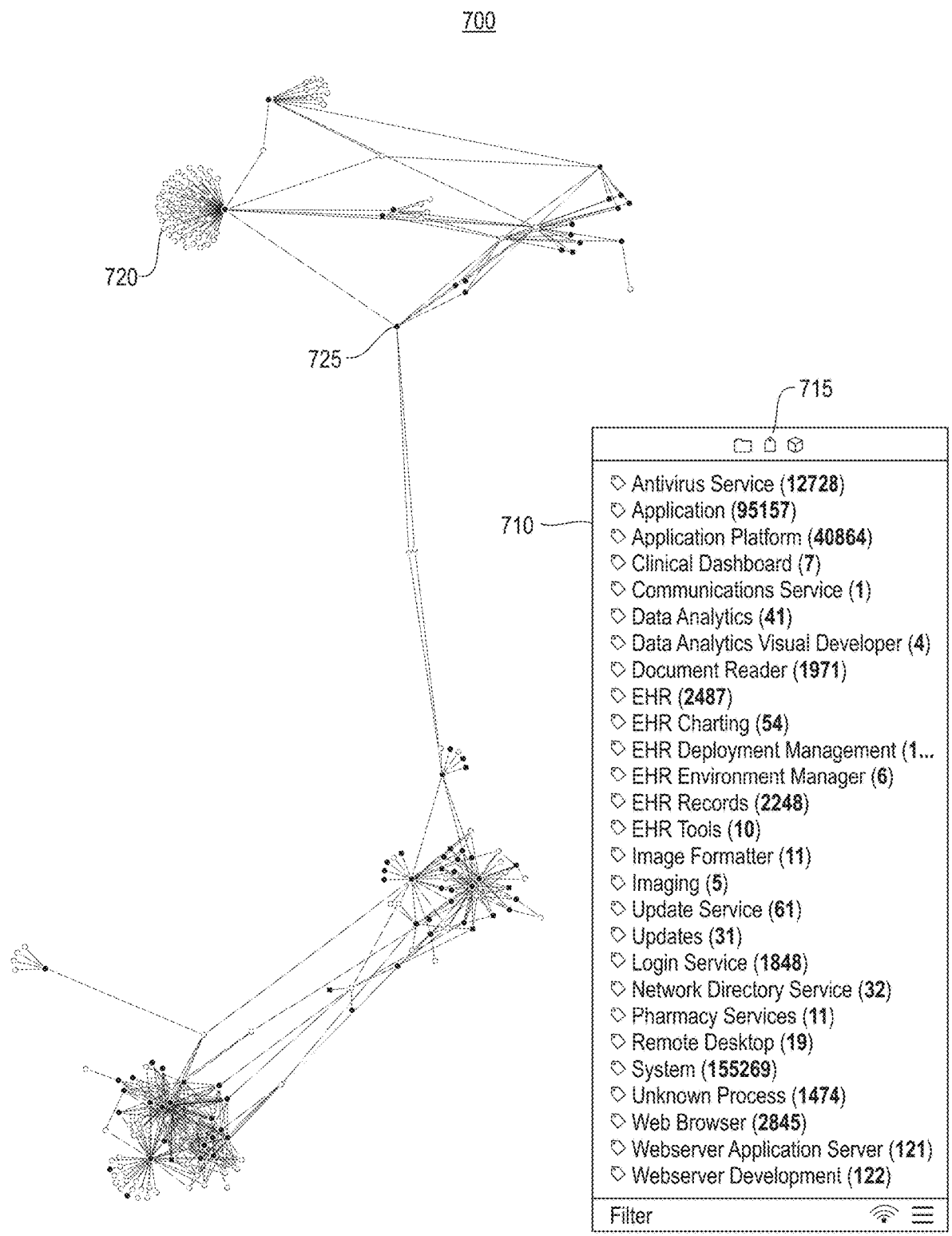
FIG. 7 illustrates a graph of representative nodes in a data center running specific software and the dependencies for these nodes, according to one embodiment.

FIG. 7 illustrates representative graph 700 of nodes (indicated as solid black circles, e.g., node 725) in a data center running specific software and the dependencies for these nodes (shown as white with a black outline, e.g., dependent nodes 720), according to one embodiment. The term nodes may refer to any process, machine, VM, device, application, server, etc. The list 710 includes the services and applications running on the data center. The icon 715 represents tags associated with the services and applications. When the folder icon is selected (the icon to the left of the icon 715), a view is provided that represents an icon for showing a high-level view of the collected data, including breakdowns by operating system, hardware, and installed software, as well as a comprehensive list of all tags applied to processes discovered on the nodes. When the cube icon (the icon to the right of the icon 715) is selected, a view is shown that provides in-depth information on a selected node. This includes network interfaces, installed software, and the tags applied to processes running on that node. At the bottom-right of FIG. 7, the "fan" icon is used for toggling tag sorting between alphabetical and the count of processes associated with the tag. The "hamburger" icon (shown to the right of the fan icon) is used for toggling the list of tags between all known tags for all nodes and only tags applied to the currently visualized result set.

Understanding the functions implemented within a data center is an extremely challenging problem due to countless machine re-configuration, software updates, changing software installation, failures, malevolent external attacks, etc. Being able to quickly and precisely characterize the nature, role, connections—which are often not explicitly declared—of the multitude of nodes in a data center becomes paramount when planning data center migrations. Migrating data centers, either physically or moving applications to the cloud, is a time and resource intensive task. Preparing a migration plan involves intensive data analysis, often based on the logs and the network activities of each node in the data center. Discovering and understanding connections and dependencies can be very laborious, and missing any of them can result in unplanned failures during the migration. Traditional data analysis tools offer little support during the plan-making phase, which can take many man hours.

In one embodiment, a data exploration solution is provided by system 500 (FIG. 5) processing that allows the subject matter expert to interactively augment the data with structured knowledge and semantic information, which is not initially present in the data. One embodiment combines conventional information extraction techniques together with human-in-the-loop learning to construct a semantic representation of the functions provided by the data center. One embodiment extracts semantic knowledge about nodes or clusters of nodes in the data center. While available structured knowledge about data center nodes (process numbers, port numbers, IP addresses, etc.) is readily available, semantic knowledge about each node is not formally encoded. One embodiment uses logs from nodes in the data center to extract semantic information about the running processes. In one embodiment, the knowledge extraction is performed with a human-in-the-loop model: the system 500 processing identifies repeating patterns in the logs and queries a subject matter expert to label them (e.g., a certain log might indicate that the node hosts a "database"), the processing then generates regular expressions to label similar processes (i.e., similar logs) accordingly. The operation is repeated iteratively until the subject matter expert is satisfied with the label coverage. The system 500 processing leverages the added semantic knowledge, together with all other already available information, within a visual discovery framework user interface to support data center migration planning.

In one embodiment, as a starting point all network information collected from the data center is used and a color coded representation of all the nodes is generated, as well as their incoming and outgoing connections (e.g., the interconnecting lines in the representation). The created representative graph is (i) too big to be effectively visualized and (ii) does not contain crucial information about which processes are running on each node in order to be able to design a migration plan. Therefore, in one embodiment the system 500 processing collects information on running processes from all the nodes to characterize the nature of dependencies between each machine. The task is to effectively extract entities from each process log, where the entities of interest are the processes running on the machine. There are numerous hurdles to perform this task. First, the nature of the logs is single lines with a command which has been run on the machine and potentially a number of parameters. The format of the string is highly dependent on the operating system and on the specific command, but it is not a regular natural language sentence, therefore state of the art entity extraction tools fail. Regular expressions are helpful with identifying the meaningful parts of the process logs and matching them, when possible, to a list of candidate processes or applications. Nonetheless, not all processes are known a priori, therefore leaving numerous entities which are nearly impossible to automatically resolve (the entities extracted from the logs can have obscure names, e.g., "xyz.exe"). One embodiment adapts a human-in-the-loop approach for corpus analysis and performs the following: (i) logs are grouped that share the same entities and the processing identifies helpful clues in the parameters or in the directory paths; (ii) these are reviewed by the subject matter expert who can add a label if they recognize which application is running. A rule exploiting this knowledge is created and applied to the whole graph. As the user keeps exploring and annotating the data, the system 500 processing dynamically adds all the new tags as exploring dimensions, which can be immediately used to query and visualize the data.

Figure 8:
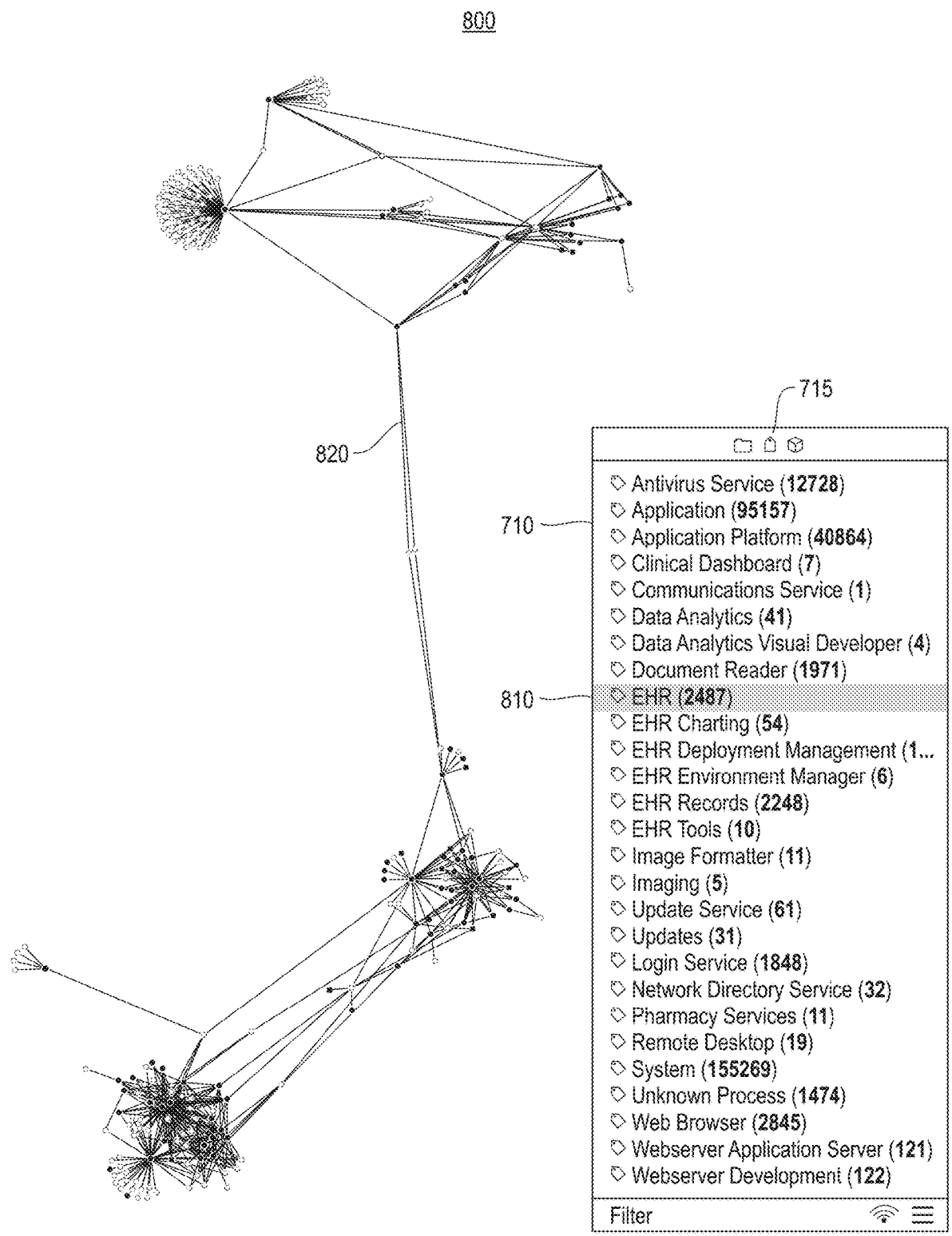
FIG. 8 illustrates an example selection of a type of software running in a data center and a graph of the representative specific node dependencies classified as being of that type, according to one embodiment.

FIG. 8 illustrates an example selection of a type of software running in a data center and a graph 800 of the representative specific node dependencies classified as being of that type, according to one embodiment. In the example graph 800, the service tagged as EHR (electronic health records) 810 is selected from the list 710. The lines 820 represent the dependencies between the nodes in the data center. After the subject matter expert has interacted with the system, creating and enriching the cartography of the data center, the next step is to perform in-depth analysis. Specifically, when considering the task of planning the data center migration, one of the paramount questions to answer is to identify nodes that support the same (or dependent) processes, or as referred to as "affinity groups." Finding a set of nodes that form an affinity group, followed by understanding the nature of the dependencies between nodes in the group is both valuable and challenging. An example of an affinity group may be a group of servers involved in providing and maintaining EHR from an EHR application. In one embodiment, graph 700 (FIG. 7) shows the initial step of surfacing an affinity group related to EHR. Each node is serving and/or consuming a service identified as EHR. Where nodes are connected by lines, the nature of the dependencies between those nodes includes EHR (and likely many more classifications as well). Graph 800 shows the same cluster when the user selects EHR 810 from the list 710 on the right side of the screen (of a user interface or graphical user interface (GUI)), highlighting all dependencies involving EHR 810. This shows all tags involved in the current visualization, but given that the original query asked for an EHR affinity group, it follows that every dependency would be highlighted in red. To drill down further, a user can interactively select the other tags represented in the visualization to surface the dependencies where those tags are also involved.

Figure 9:
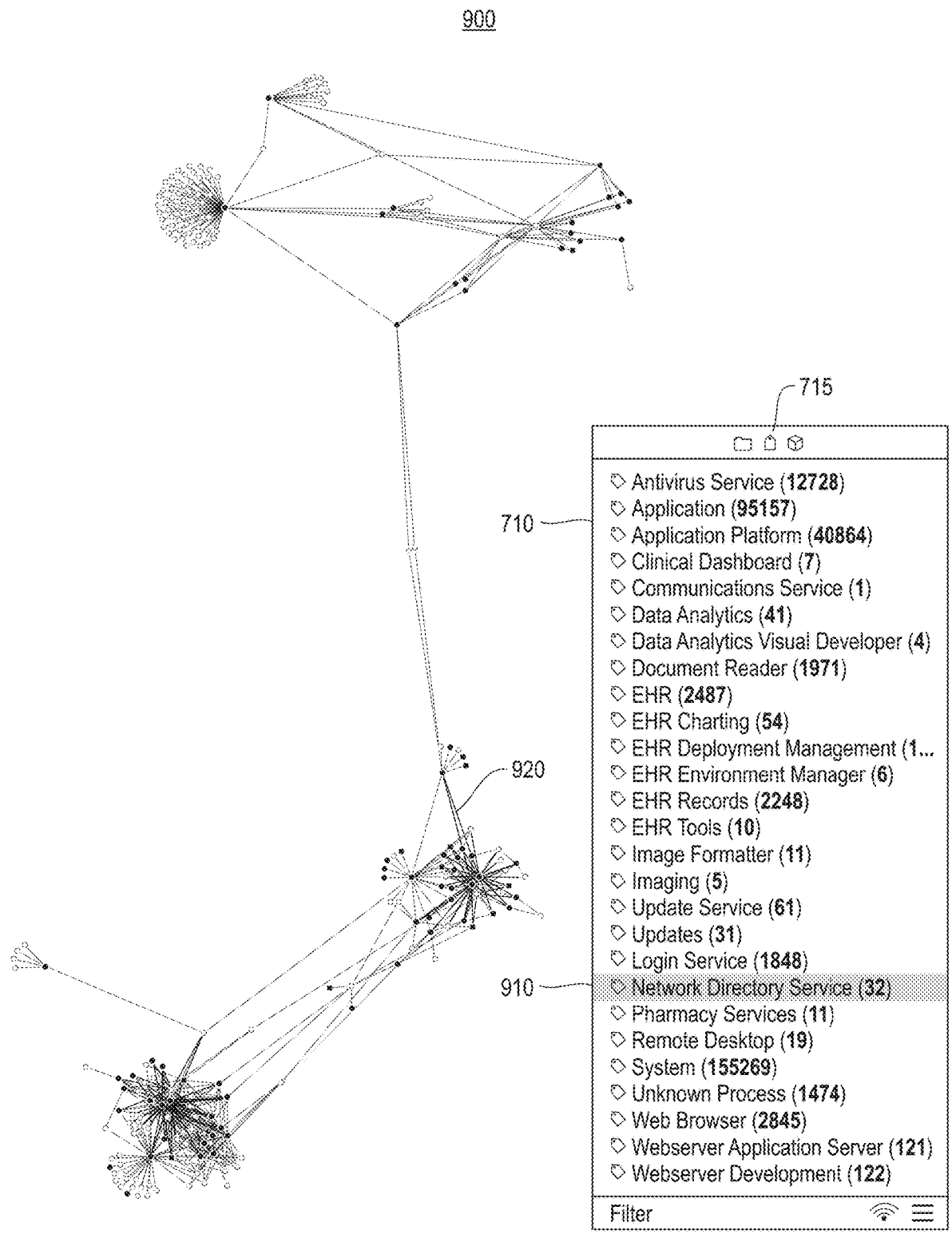
FIG. 9 illustrates an example selection of a tag for a service in a data center from a set of tags resulting from a query, and a graph of a representative subset of dependencies classified as being of that type of service, according to one embodiment.

FIG. 9 illustrates an example selection of a tag for a service in a data center from a set of tags resulting from a query, and a graph 900 of a representative subset of dependencies classified as being of that type of service, according to one embodiment. In graph 900, selecting "Network Directory Service" 910 highlights a subset of the visualized dependencies (as shown in graph 800, FIG. 8). The lines 920 represent the dependencies between the nodes in the data center. By visualizing the dependencies, tightly coupled groups are easily identified by the human eye. In the case of "Network Directory Service" 910, one can immediately see there are two (2) main nuclei, each with a set of non-overlapping dependent nodes. This sort of visualization also exposes insights that may not have been directly queried. The vast majority of business critical application groups will include a resiliency layer to provide redundancy, data backups, etc. However, the list of categories included in the EHR cluster does not include "Resiliency" or "Backup." To a user familiar with dependency grouping, this anomaly is striking. For example, this particular cluster could have suffered an outage the week before, without any disaster recovery in place, effectively taking the whole business application offline.

Data exploration is a task that inherently requires a tight human interaction. The more complex the data and the scenarios, the more the need of a carefully designed methodology to support a human-in-the-loop paradigm. Migrating a data center is a difficult and very critical task faced by many enterprises looking to increase flexibility, reduce costs, and enhance resiliency. The process requires a deep understanding of the dependencies between nodes, as well as the relations between larger clusters of nodes, either to each other and/or with other shared resources (e.g., data stores, APIs, etc.). Conventionally, designing a migration plan can take 3-6 months, followed by 12-18 months for execution. Additionally, inevitable "missteps" along the way can cost substantial amounts of time and effort to resolve, along with the larger risk of business application outages. One embodiment enables subject matter experts to obtain the necessary understanding of a data center in a faster and more accurate fashion. The cartography tool using the processing of system 500 (FIG. 5) helps the subject matter experts in the design of migration plans, which results in a positive reduction of design time and a significant reduction of mistakes/misunderstandings. The subject matter expert is provided with a clearer, more precise picture of the world they are working in, such that the job of planning and executing a smooth data center migration is far more realizable.

Figure 10:
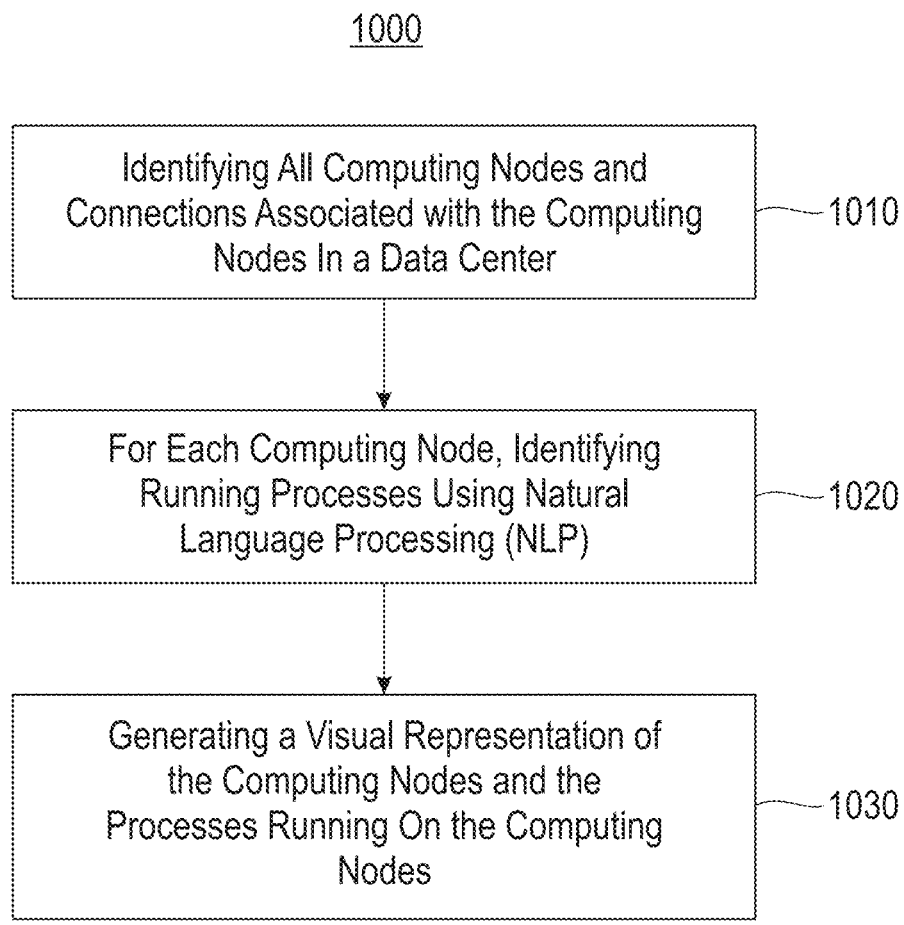
FIG. 10 illustrates a block diagram of a process for data center cartography generation, according to one embodiment.

FIG. 10 illustrates a block diagram for process 1000 for data center cartography generation, according to one embodiment. In block 1010, process 1000 identifies all computing nodes and connections associated with the computing nodes in a data center (e.g., by a processor from computing node 10, FIG. 1, hardware and software layer 60, FIG. 2, processing system 300, FIG. 3, system 400, FIG. 4, system 500, FIG. 5, etc.). In block 1020, for each computing node, process 1000 identifies running processes using natural language processing (NLP) by: extracting known process entities according to predetermined rules; extracting unknown process entities by: grouping process logs that share process entities and identifying hints in parameters and directory paths, and receiving annotations (e.g., by human-in-the-loop, machine learning, etc.) to the hints to identify an application a process is running. In block 1030, process 1000 creates a new rule based on the annotations and propagating the new rule to other process logs.

In one embodiment, process 1000 may include that a rule includes a tag set, a type and text. In one embodiment, process 1000 may further include assigning a tag to each line of a process table. Process 1000 may also include mapping the tags into an ontology of processes.

In one embodiment, in process 1000 the rule is embodied in a rule file having a naming convention of a number and a particular name. Process 1000 may include that the visual representation includes a selection tool for selecting particular applications and services, and manipulating the visual representation based on computing nodes and associated dependencies. In one embodiment, an annotation includes a label assigned to the application.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

References in the claims to an element in the singular is not intended to mean "one and only" unless explicitly so stated, but rather "one or more." All structural and functional equivalents to the elements of the above-described exemplary embodiment that are currently known or later come to be known to those of ordinary skill in the art are intended to be encompassed by the present claims. No claim element herein is to be construed under the provisions of 35 U.S.C. section 112, sixth paragraph, unless the element is expressly recited using the phrase "means for" or "step for."

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
   identifying all computing nodes and connections associated with the computing nodes in a data center based on running processes in the data center that communicate with one another;
   for each computing node, identifying the running processes using natural language processing (NLP) by:
      iteratively refining a rule set that enables processing of surveillance information from the data center into an initial map of systems and applications in the data center;
      extracting known process entities according to predetermined rules from the rule set; and
      generating a visual dependency representation of the computing nodes and the processes running on the computing nodes.

2. The method of claim 1, wherein for each computing node, further identifying the running processes using NLP by:
   extracting unknown process entities by:
      grouping process logs from computing nodes that share process entities and identifying hints in parameters and directory paths, wherein the process logs include structured knowledge without semantic knowledge formally encoded;
      receiving annotations to the hints to identify an application a process is running; and
      creating a new rule based on the annotations and propagating the new rule to other process logs.

3. The method of claim 2, wherein a rule comprises a tag set, a type and text, and the structured knowledge in the process logs includes process numbers, port numbers and Internet Protocol (IP) addresses.

4. The method of claim 3, further comprising:
   assigning a tag to each line of a process table; and
   mapping the tags into an ontology of processes.

5. The method of claim 3, wherein the rule is embodied in a rule file having a naming convention of a number and a particular name.

6. The method of claim 3, wherein the visual representation comprises a selection tool for selecting particular applications and services, manipulating the visual representation based on computing nodes and associated dependencies, and the computing nodes comprise processes, machines, virtual machines, applications and servers.

7. The method of claim 3, wherein an annotation comprises a label assigned to the application, and the label adds semantic knowledge to the process logs.

8. A computer program product for generating a visual representation of computing nodes and connections in a data center, the computer program product comprising a non-transitory computer readable storage medium having program instructions embodied therewith, the program instructions executable by a processor to cause the processor to:
   identify, by the processor, all computing nodes and connections associated with the computing nodes in a data center based on running processes in the data center that communicate with one another;
   for each computing node, identify, by the processor, the running processes using natural language processing (NLP) by:
      iteratively refine, by the processor, a rule set that enables processing of surveillance information from the data center into an initial map of systems and applications in the data center;
      extract, by the processor, known process entities according to predetermined rules; and
      generate, by the processor, a visual dependency representation of the computing nodes and the processes running on the computing nodes.

9. The computer program product of claim 8, wherein the program instructions executable by the processor further cause the processor to:
   for each computing node, identify, by the processor, the running processes using NLP further by:
      extract, by the processor, unknown process entities by:
         group, by the processor, process logs from computing nodes that share process entities and identifying hints in parameters and directory paths, wherein the process logs include structured knowledge without semantic knowledge formally encoded;
         receive, by the processor, annotations to the hints to identify an application a process is running; and
         create, by the processor, a new rule based on the annotations and propagating the new rule to other process logs.

10. The computer program product of claim 9, wherein a rule comprises a tag set, a type and text, and the structured knowledge in the process logs includes process numbers, port numbers and Internet Protocol (IP) addresses.

11. The computer program product of claim 10, wherein:
the program instructions executable by the processor further to cause the processor to:
assign, by the processor, a tag to each line of a process table; and
map, by the processor, the tags into an ontology of processes; and
the rule is embodied in a rule file having a naming convention of a number and a particular name.

12. The computer program product of claim 10, wherein the visual representation comprises a selection tool for selecting particular applications and services, manipulating the visual representation based on computing nodes and associated dependencies, and the computing nodes comprise processes, machines, virtual machines, applications and servers.

13. The computer program product of claim 10, wherein an annotation comprises a label assigned to the application, and the label adds semantic knowledge to the process logs.

14. An apparatus comprising:
a memory configured to store instructions; and
a processor configured to execute the instructions to:
identify all computing nodes and connections associated with the computing nodes in a data center based on running processes in the data center that communicate with one another;
for each computing node, identify the running processes using natural language processing (NLP) by:
iteratively refine a rule set that enables processing of surveillance information from the data center into an initial map of systems and applications in the data center; and
extracting known process entities according to predetermined rules; and
generate a visual dependency representation of the computing nodes and the processes running on the computing nodes.

15. The apparatus of claim 14, wherein for each computing node, further identifying the running processes using NLP by:
extracting unknown process entities by:
grouping process logs from computing nodes that share process entities and identifying hints in parameters and directory paths, wherein the process logs include structured knowledge without semantic knowledge formally encoded;
receiving annotations to the hints to identify an application a process is running; and
creating a new rule based on the annotations and propagating the new rule to other process logs.

16. The apparatus of claim 15, wherein a rule comprises a tag set, a type and text, and the structured knowledge in the process logs includes process numbers, port numbers and Internet Protocol (IP) addresses.

17. The apparatus of claim 16, wherein the processor is further configured to execute the instructions to:
assign a tag to each line of a process table; and
map the tags into an ontology of processes.

18. The apparatus of claim 17, wherein the rule is embodied in a rule file having a naming convention of a number and a particular name.

19. The apparatus of claim 16, wherein the visual representation comprises a selection tool for selecting particular applications and services, manipulating the visual representation based on computing nodes and associated dependencies, and the computing nodes comprise processes, machines, virtual machines, applications and servers.

20. The apparatus of claim 16, wherein an annotation comprises a label assigned to the application, and the label adds semantic knowledge to the process logs.

* * * * *